US011624338B2

(12) United States Patent
Hirayama et al.

(10) Patent No.: US 11,624,338 B2
(45) Date of Patent: Apr. 11, 2023

(54) SLIDING MECHANISM

(71) Applicant: NISSAN MOTOR CO., LTD., Yokohama (JP)

(72) Inventors: Hayato Hirayama, Kanagawa (JP); Tsuyoshi Higuchi, Kanagawa (JP); Hiroaki Hoshikawa, Kanagawa (JP); Naoya Tainaka, Kanagawa (JP)

(73) Assignee: NISSAN MOTOR CO., LTD., Yokohama (JP)

(*) Notice: Subject to any disclaimer, the term of this patent is extended or adjusted under 35 U.S.C. 154(b) by 0 days.

(21) Appl. No.: 17/628,344

(22) PCT Filed: Jan. 19, 2021

(86) PCT No.: PCT/JP2021/001555

§ 371 (c)(1),
(2) Date: Jan. 19, 2022

(87) PCT Pub. No.: WO2021/161728

PCT Pub. Date: Aug. 19, 2021

(65) Prior Publication Data

US 2022/0260035 A1 Aug. 18, 2022

(30) Foreign Application Priority Data

Feb. 13, 2020 (JP) ............................. JP2020-022173

(51) Int. Cl.
*F02F 3/00* (2006.01)
*F02F 7/00* (2006.01)
*F16J 10/04* (2006.01)

(52) U.S. Cl.
CPC ............. *F02F 7/0085* (2013.01); *F16J 10/04* (2013.01)

(58) Field of Classification Search
CPC ............... F16J 9/26; F02F 5/00; F02F 7/0085
USPC ....................................................... 123/193.4
See application file for complete search history.

(56) References Cited

U.S. PATENT DOCUMENTS 11,168,790 B2 * 11/2021 Kameda ................ C23C 14/025
2003/0192501 A1 10/2003 Ishikawa et al.
2016/0230697 A1 * 8/2016 Shinohara ................. C23C 4/06
(Continued)

FOREIGN PATENT DOCUMENTS

CN 105555989 A 5/2016
EP 3 604 627 A1 2/2020
GB 0 731 298 6/1955
(Continued)

OTHER PUBLICATIONS

Application of Ion Implantation in Aviation Piston Pump: China Academic Journal Electronic Publishing House, Jun. 2001, pp. 39-41.

*Primary Examiner* — Long T Tran
*Assistant Examiner* — James J Kim
(74) *Attorney, Agent, or Firm* — Foley & Lardner LLP

(57) ABSTRACT

A sliding mechanism of the present invention includes a cylinder bore having a thermally sprayed iron-based coating and includes a piston with a piston ring covered with a hard coating composed mainly of carbon.
The thermally sprayed coating has diamond abrasive grains. An area ratio of the diamond abrasive grains to a surface of the thermally sprayed coating is 0.3 to 1.8%, which enables suppressing wear of the piston ring having the hard coating composed mainly of carbon.

2 Claims, 2 Drawing Sheets

(56) References Cited

U.S. PATENT DOCUMENTS

| | | | |
|---|---|---|---|
| 2020/0256277 | A1 | 8/2020 | Kawai et al. |

FOREIGN PATENT DOCUMENTS

| | | | |
|---|---|---|---|
| JP | 4-210380 | A | 7/1992 |
| JP | 2003-286895 | A | 10/2003 |
| JP | 2004-18908 | A | 1/2004 |
| JP | 2008-19718 | A | 1/2008 |
| JP | 2018-159099 | A | 10/2018 |
| WO | WO 2020/022032 | A1 | 1/2020 |

* cited by examiner

SLIDING MECHANISM

TECHNICAL FIELD

The present invention relates to a sliding mechanism, and in more detail, relates to a sliding mechanism including a cylinder bore and a piston with a piston ring of an internal combustion engine.

BACKGROUND ART

Sliding mechanisms of internal combustion engines of automobiles and so on require wear resistance and low friction.

For such sliding mechanisms, a known combination includes the following cylinder bore and piston. The cylinder bore includes a thermally sprayed iron-based coating having a hardness higher than that of a metal material constituting a cylinder block body. The piston includes a piston ring that is covered with a hard coating composed mainly of carbon.

The thermally sprayed coating is formed by spraying droplets of an iron-based metal material on a pretreated surface of a bore of a cylinder block that is preheated. This thermally sprayed coating has a large surface roughness due to traces of thermally sprayed droplets adhering to its surface. In consideration of this, the formed thermally sprayed coating is finely finished by honing so that roundness, cylindricity, and surface roughness of the cylinder bore will be excellent.

Honing of the thermally sprayed coating uses a honing stone containing diamond abrasive grains, as disclosed in Patent Document 1.

CITATION LIST

Patent Document
Patent Document 1: JP 2004-18908A

SUMMARY OF INVENTION

Technical Problem

A piston ring that includes the hard coating composed mainly of carbon has high hardness and excellent wear resistance, but does not exert desired wear resistance in some cases. The inventors of the present invention have conducted an intensive study on the causes of this problem and have found that diamond abrasive grains embedded in a thermally sprayed coating, which is a mating member, are one of the causes.

The present invention has been made based on this finding, and an object of the present invention is to provide a sliding mechanism including a piston with a piston ring that is covered with a hard coating composed mainly of carbon and including a cylinder bore that is unlikely to wear the piston ring.

Solution to Problem

The inventors of the present invention have further studied in order to achieve the object of the present invention, and they have found that controlling an area ratio of diamond abrasive grains embedded in a thermally sprayed iron-based coating, to be within a predetermined range, enables achieving the above object. Thus, the present invention has been completed.

That is, the sliding mechanism of the present invention includes a cylinder bore having a thermally sprayed iron-based coating and includes a piston with a piston ring having a hard coating composed mainly of carbon.

The thermally sprayed coating has diamond abrasive grains. An area ratio of the diamond abrasive grains to a surface of the thermally sprayed coating is 0.3 to 1.8%.

Advantageous Effects of Invention

In the present invention, diamond abrasive grains are embedded in the thermally sprayed iron-based coating of the cylinder bore, and the area ratio of the abrasive grains to the surface of the thermally sprayed iron-based coating is controlled to be within a predetermined range. Thus, it is possible to provide a sliding mechanism that is unlikely to wear a piston ring having a hard coating composed mainly of carbon.

DESCRIPTION OF EMBODIMENTS

A sliding mechanism of the present invention will be described in detail.

The sliding mechanism includes a cylinder bore having a thermally sprayed iron-based coating and includes a piston with a piston ring having a hard coating composed mainly of carbon.

<Cylinder Bore>

The cylinder bore has a thermally sprayed iron-based coating (which may be hereinafter simply referred to as a "thermally sprayed coating") on an inner circumferential surface of the cylinder bore. The thermally sprayed coating is honed with a diamond honing stone, and thereby includes diamond abrasive grains originating from the diamond honing stone. The diamond abrasive grains are embedded in the surface of the thermally sprayed coating in the area ratio of 0.3 to 1.8%.

Honing is a fine finishing process that provides intended surface roughness, dimensions, roundness, and cylindricity. In honing, a honing stone is pressed against an inner circumferential surface of a thermally sprayed coating formed on an inner circumferential surface of a cylinder bore, at a constant pressure, and rotation motion and reciprocating motion are continuously provided between the honing stone and the cylinder bore while honing oil is poured.

Unfortunately, in such a conventional processing method, upper and lower end parts of a cylinder bore receive great stress due to variations in the grinding direction, whereby diamond abrasive grains are easily embedded therein.

The upper end part of a cylinder bore is positioned at a top dead center of a piston, where little lubricating oil is supplied. A great amount of abrasive grains that are embedded in the upper end part of a cylinder bore reduce wear resistance of a piston ring. In particular, as to a variable compression ratio engine in which the position of a top dead center varies, lubricating oil is hardly supplied at the time the top dead center rises, and therefore, wear resistance of a piston ring is drastically reduced.

Figure 1:
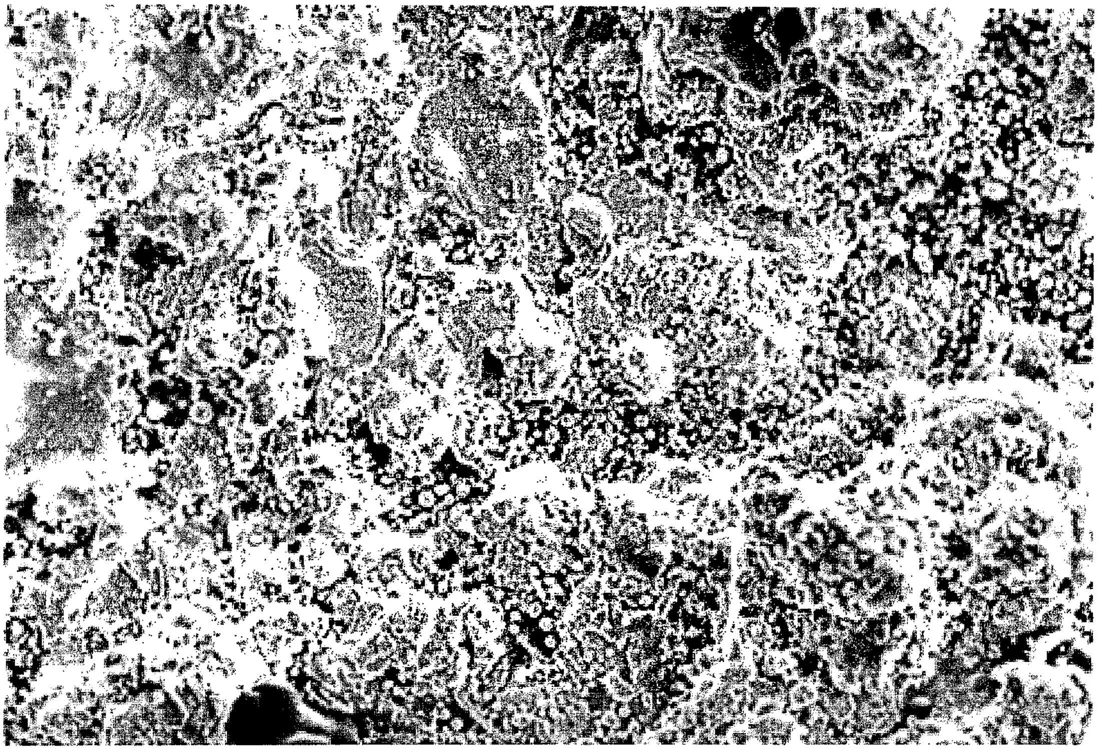
FIG. 1 is a SEM image of a surface of a thermally sprayed coating before honing.
Figure 2:
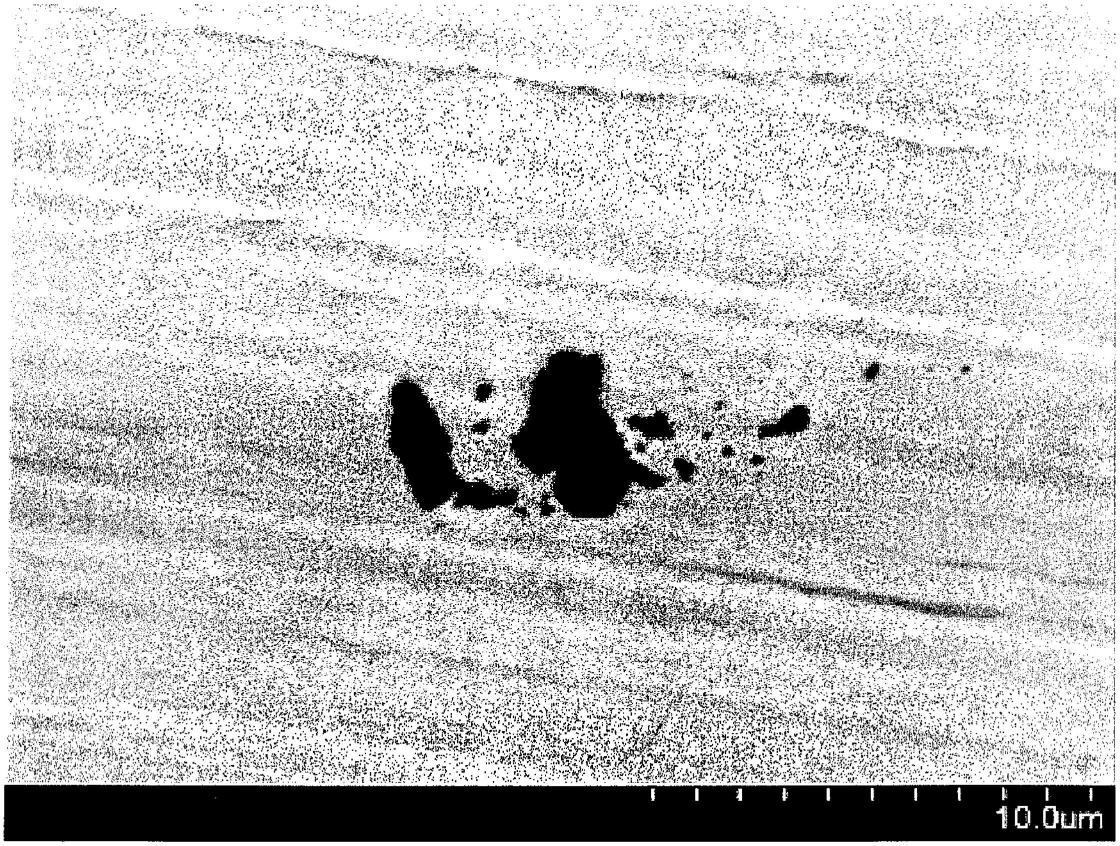
FIG. 2 is a SEM image of a surface of a thermally sprayed coating after honing.

FIG. 1 illustrates a SEM image of a surface of a thermally sprayed coating before honing. FIG. 2 illustrates a SEM image of a surface of a thermally sprayed coating after honing. In FIG. 2, black points at the center represent embedded diamond abrasive grains.

In the present invention, grinding is performed by pulling out a honing stone that is rotating, in one direction from one end to the other end, instead of continuously reciprocating a honing stone that is rotating within a cylinder bore. This reduces embedding of abrasive grains in upper and lower end parts of a cylinder bore. As a result, the area ratio of the diamond abrasive grains embedded in the thermally sprayed coating is 0.3 to 1.8%, whereby wear of a piston ring is reduced, and wear resistance is improved.

In a case in which the area ratio of the diamond abrasive grains exceeds 1.8%, wear resistance is reduced. In order to obtain an area ratio of the diamond abrasive grains of less than 0.3%, honing should be performed under very moderate conditions, which reduces working efficiency.

In honing, the force of pressing a diamond honing stone against a thermally sprayed coating is preferably 1900 (N) or lower. A pressing force exceeding 1900 (N) facilitates chipping of a diamond honing stone and increases the area ratio of the diamond abrasive grains.

The lower limit of the pressing force is not specifically limited, but it is preferably 300 (N) or higher from the point of view of working efficiency.

As the removal amount of honing, that is, the thickness of the thermally sprayed coating polished away by honing, increases, the area ratio of the diamond abrasive grains increases. For this reason, the removal amount is preferably 15 μm or less. On the other hand, in a case in which the removal amount is less than 5 μm it may be difficult to reduce roughness of the surface of the thermally sprayed coating originating from the thermally sprayed droplets, and mirror finishing of the cylinder bore (so that the surface roughness Ra will be 0.1 μm or less) may be hardly performed. In view of these reasons, 5 μm or more and 15 μm or less is preferable.

The number of times of strokes for pulling out a honing stone upward or downward in honing is not specifically limited. Although different depending on the force of pressing the honing stone and the hardness of the thermally sprayed coating, the area ratio of the diamond abrasive grains embedded in the thermally sprayed coating increases with an increase in the number of times of strokes.

It is preferable that the diamond abrasive grains embedded in the thermally sprayed coating have a hardness of 6000 to 16000 (HV) and have a maximum grain size of 8 μm or smaller.

As the hardness of the diamond honing stone to be used in honing is lower, wear resistance of the piston ring is improved.

In a case in which the embedded diamond abrasive grains have a maximum grain size exceeding 8 their aggressiveness to a mating member increases, resulting in reduction in wear resistance of the piston ring.

The maximum grain size of the diamond abrasive grains embedded in the thermally sprayed coating can be adjusted by the force of pressing the diamond honing stone against the thermally sprayed coating.

Note that the maximum grain size of the abrasive grains in the present invention represents a length of the longest part of the largest abrasive grain among the embedded diamond abrasive grains, as observed from a normal direction of a cylinder surface.

In the present invention, shapes, an area ratio, and a maximum grain size of abrasive grains embedded in the thermally sprayed coating were measured in an image that was binarized by image processing. This image was obtained by observing an inner circumferential surface of an upper end part (an area from an upper end to 1 cm below the upper end) of a honed cylinder bore, at a magnification of 5000 times, with the use of a scanning electron microscope (SEM). The abrasive grains with sizes of 0.1 μm or smaller were not considered in calculation of the area ratio.

In the present invention, an average hardness (HV) of the thermally sprayed coating is preferably in a range of 300 to 500.

In a case in which the average hardness (HV) is less than 300, wear of the thermally sprayed coating may increase, resulting in an increased clearance and an increased oil consumption. On the other hand, in a case in which the average hardness (HV) exceeds 500, aggressiveness to a piston ring, which is a mating member, may increase, resulting in increased wear of the piston ring.

The thermally sprayed coating of the present invention described above is composed mainly of iron (Fe), but preferably contains 0.05 to 0.25 mass % of carbon (C).

A thermally sprayed coating having a carbon amount of less than 0.05 mass has decreased hardness and strength and may peel off. On the other hand, a thermally sprayed coating having a carbon amount exceeding 0.25 mass % has increased hardness and has thereby increased aggressiveness to a mating member.

The thermally sprayed coating may be covered on the whole inner surface of the bore or may be covered on a part of the inner surface of the bore that slides on the piston, in accordance with stroke of the used piston.

The body of the cylinder block may be made of cast iron, but it is preferably made of aluminum alloy or magnesium alloy. This makes it possible to reduce weight of an internal combustion engine.

In this cylinder block for an internal combustion engine, a liner made of another metal, for example, a cast iron liner or an aluminum alloy liner, can be placed on the bore, and the inner surface of this liner can be covered with the thermally sprayed coating.

<Piston Ring>

The piston ring of the present invention has a hard coating composed mainly of carbon (which may be hereinafter simply referred to as a "hard coating"), at least on an outer circumferential surface of a base metal.

The hard coating of the present invention is a crystalline or amorphous coating composed mainly of carbon (C). An example of the crystalline hard coating includes a diamond coating. The amorphous hard coating can use what is called diamond-like carbon (DLC) that has both a diamond structure ($SP^3$ bonding) and a graphite structure ($SP^2$ bonding) as bonding forms of carbons.

Examples of diamond-like carbon include amorphous carbon (a—C) excluding hydrogen and hydrogen amorphous carbon (a—C:H) containing hydrogen, and they may partially contain a metal element, such as titanium (Ti) or molybdenum (Mo).

The hard coating can be formed by a CVD method or a PVD method. In general, a hard coating that is formed by a CVD method, such as a thermal CVD method or a plasma CVD method, contains hydrogen originating from an organic compound of a raw material (for example, hydrocarbon gas), and a hydrogen concentration of the hard coating is typically 15 to 40 atomic %.

The average hardness (HV) of the hard coating is preferably 1600 to 5000 and is more preferably 1600 to 2100.

The base metal of the piston ring can include publicly known metal materials that are conventionally used in piston rings, such as Cr—V steels and Mn—Cr steels.

EXAMPLES

The present invention will be detailed with reference to examples hereinafter, but the present invention should not be limited to the examples described below.

An inner circumferential surface of a cylinder of an aluminum alloy (ADC12Z) cylinder block for a gasoline engine was grooved to a depth of approximately 85 μm and was then preprocessed.

An iron-based thermally spray wire containing carbon was electroplated with copper (Cu), and a thermally sprayed coating was formed so as to have a film thickness of 270 μm from a groove bottom by an arc spraying method.

In thermal spraying, after the cylinder block was preheated to 120° C., a nozzle was inserted in the cylinder bore at a room temperature, and thermal spray droplets were sprayed at 1200 L/min in the atmosphere while nitrogen gas was used for dispersing the thermal spray droplets and nitrogen gas was also flowed at 500 L/min as a shielding gas. Thus, a cylinder bore having an inner diameter of approximately 80 mm and a total length of approximately 120 mm was produced.

Next, a diamond honing stone was inserted in the cylinder bore, and diamond honing stone was pressed against the cylinder bore and was repeatedly pulled out upward and downward in an alternate manner while the diamond honing stone was rotated under the conditions shown in Table 1. Honing was thus performed, whereby the inner surface of the cylinder bore was mirror finished (so as to have a surface roughness Ra of 0.1 μm or less).

<Evaluation>

The mirror finished cylinder bore and a piston ring having a hard coating composed mainly of carbon were subjected to a vibration friction wear test (SRV test) under the following conditions, and wear resistance (wear amount) of the piston ring was evaluated. The hardness of diamond abrasive grains embedded in the thermally sprayed coating was 9000 (HV). The results of evaluation are shown in Table 1.

Size of test piece of cylinder bore: 15 mm×20 mm
Test piece temperature: not measured
Oil: PAO having a kinematic viscosity of 4 cSt at 100° C.
Load: 300 N
Stroke: 3 mm
Frequency: 25 Hz
Test time: 1 hr

TABLE 1

(1/2)

| | Honing | | |
|---|---|---|---|
| | Number of Times of Strokes | Force of Pressing Honing Stone (N) | Removal Amount (μm) |
| Example 1 | 10 | 1800 | 15 |
| Example 2 | 10 | 1800 | 10 |
| Example 3 | 12 | 1800 | 15 |
| Example 4 | 11 | 1800 | 15 |
| Example 5 | 12 | 1800 | 10 |
| Example 6 | 11 | 1800 | 10 |
| Example 7 | 10 | 1800 | 8 |
| Example 8 | 11 | 1800 | 8 |
| Example 9 | 10 | 1800 | 8 |
| Example 10 | 11 | 1800 | 4 |
| Example 11 | 10 | 1800 | 8 |
| Example 12 | 12 | 1800 | 8 |
| Comparative Example 1 | 25 | 2000 | 15 |
| Comparative Example 2 | 20 | 2000 | 15 |
| Comparative Example 3 | 15 | 2000 | 15 |

(continued, 2/2)

| | Cylinder Bore | | | Piston Ring | |
|---|---|---|---|---|---|
| | Area Ratio of Abrasive Grains (%) | Maximum Abrasive Grain Size (μm) | Bore Hardness (HV) | Ring Hardness (HV) | Evaluation Ring Wear Amount (μm) |
| Example 1 | 1.4 | 8 | 340 | 1600 | 316 |
| Example 2 | 1.1 | 8 | 379 | 1600 | 340 |
| Example 3 | 1.8 | 8 | 450 | 1600 | 543 |
| Example 4 | 1.6 | 8 | 340 | 5000 | 312 |
| Example 5 | 1.3 | 8 | 379 | 5000 | 388 |
| Example 6 | 1.2 | 8 | 450 | 5000 | 469 |
| Example 7 | 0.3 | 8 | 340 | 1600 | 299 |
| Example 8 | 0.4 | 8 | 379 | 1600 | 333 |
| Example 9 | 0.3 | 8 | 450 | 1600 | 498 |
| Example 10 | 0.4 | 8 | 340 | 5000 | 309 |
| Example 11 | 0.3 | 8 | 379 | 5000 | 363 |
| Example 12 | 0.5 | 8 | 450 | 5000 | 502 |
| Comparative Example 1 | 3.2 | 8 | 340 | 1600 | 832 |
| Comparative Example 2 | 2.8 | 8 | 379 | 1600 | 882 |
| Comparative Example 3 | 2.6 | 8 | 450 | 1600 | 867 |

The results as shown in Table 1 reveal that Examples having an area ratio of diamond abrasive grains of 0.3 to 1.8% were superior in wear resistance to sliding mechanisms of Comparative Examples.

The invention claimed is:

1. A sliding mechanism comprising:

a cylinder bore having a thermally sprayed iron-based coating; and a piston with a piston ring having a hard coating composed mainly of carbon, the thermally sprayed coating having diamond abrasive grains, an area ratio of the diamond abrasive grains to a surface of the thermally sprayed coating being 0.3 to 1.8%.

2. The sliding mechanism according to claim 1, wherein the diamond abrasive grains have a hardness of 6000 to 16000 (HV) and have a maximum grain size of 8 μm or smaller.

* * * * *